United States Patent
Liu

(10) Patent No.: US 7,562,600 B2
(45) Date of Patent: Jul. 21, 2009

(54) SLAT ANGLE ADJUSTING DEVICE FOR A VENETIAN BLIND

(76) Inventor: Tai-Ping Liu, No. 18, Alley 8, Lane 3, Kuo-Chi St., Lung-Ching Hsiang, Taichung Hsien (TW)

( * ) Notice: Subject to any disclaimer, the term of this patent is extended or adjusted under 35 U.S.C. 154(b) by 923 days.

(21) Appl. No.: 10/954,471

(22) Filed: Oct. 1, 2004

(65) Prior Publication Data

US 2006/0070474 A1 Apr. 6, 2006

(51) Int. Cl.
*F16H 1/16* (2006.01)
*E06B 9/38* (2006.01)

(52) U.S. Cl. ............... 74/425; 74/89.14; 160/176.1 R; 160/177 R; 160/188

(58) Field of Classification Search ............... 74/89.14, 74/425, 458; 160/176.1 R, 177 R, 188
See application file for complete search history.

(56) References Cited

U.S. PATENT DOCUMENTS

| 1,761,962 | A | * | 6/1930 | Babitch | 74/458 |
| 1,794,907 | A | * | 3/1931 | Kelly | 74/458 |
| 2,098,439 | A | * | 11/1937 | Stuber | 74/458 |
| 5,636,677 | A | * | 6/1997 | Liu | 160/177 R |
| 6,601,636 | B1 | * | 8/2003 | Liu | 160/177 R |

* cited by examiner

*Primary Examiner*—William C Joyce
(74) *Attorney, Agent, or Firm*—Bacon & Thomas, PLLC

(57) ABSTRACT

A slat angle adjusting device has a body, a positioning bar, a pinion, a drive axle, a rotating rod and a roller. The drive axle is rotatably mounted inside the body, engages with the pinion and has at least one helical tooth and an engaging end provided with multiple teeth. Each helical tooth is composed of multiple separate helical tooth elements, and a gap is defined between each pair of adjacent helical tooth elements. With the arrangement of gaps between the teeth elements, burs are prevented from occurring on the helical teeth of the drive axle, such that the transmission between the drive axle and the pinion is smooth.

13 Claims, 7 Drawing Sheets

SLAT ANGLE ADJUSTING DEVICE FOR A VENETIAN BLIND

BACKGROUND OF THE INVENTION

1. Field of the Invention

The present invention relates to a slat angle adjusting device, and more particularly to a slat angle adjusting device for a venetian blind and one that is smooth in operation.

2. Description of Related Art

With reference to FIGS. 5 and 6, a conventional slat angle adjusting device for a Venetian blind in accordance with the prior art comprises a body, a pinion (33), a drive axle (34), a rotating rod (36) and a roller (38). The body is composed of a base (30) and a cover (32). A positioning base (302) is formed on the top of the base (30) to engage with a headrail of the venetian blind to mount the adjusting device to the headrail. The pinion (33) is rotatably mounted inside the body and has a non-circular through hole defined through the pinion (33). With the through hole, the pinion (33) engages with a tilt rod with a non-circular cross section to drive the tilt rod to rotate with the pinion (33). The drive axle (34) is rotatably mounted inside the body and has at least one helical tooth (342) to engage with the pinion (33). The drive axle (34) further has an engaging end provided with multiple teeth (344). The rotating rod (36) is rotatably attached to the body and has an inner end extending into the body. The inner end of the rotating rod has multiple teeth (362) engaging with the teeth (344) on the drive axle (34). The roller (38) is attached to the rotating rod (36), and a tilt cord is mounted around the roller (38) to rotate the roller (38) when the cord is pulled.

Accordingly, when the tilt cord is pulled, the tilt rod is rotated with the transmission of the roller (38), the rotating rod (36), the drive axle (34) and the pinion (33). With the rotation of the tilt rod, the angle of slats of a Venetian blind is adjusted.

Each helical tooth (342) on the drive rod (34) of the conventional adjusting device is a continuous structure, and the drive axle (34) is formed in a die-casing process by a mold combined with two mold elements. However, burs are easily formed on the helical teeth (342) at a location corresponding to the conjunction of the mold elements, and the transmission between the drive axle (34) and the pinion (33) is not smooth due to those burs.

In addition, with reference further to FIG. 7, the teeth (344,362) on the drive axle (34) and the rotating rod (36) of the conventional device have a substantially triangular cross section. With the triangular teeth (344,362), the clearances between the teeth (344,362) on the drive axle (34) and the rotating rod (36) are reduced, such that the transmission between the drive axle (34) and the rotating rod (36) is not smooth when tiny inaccuracies in sizes or shapes occur in the teeth (344,362).

Furthermore, the base (30) and the cover (32) of the conventional body do not have any positioning device, such that to precisely combine the base (30) with the cover (32) is troublesome and time-consuming. Moreover, the engaging relationships between the pinion (33), the drive axle (34) and the rotating rod (36) will fail if the base (30) is not precisely combined with the cover (32).

To overcome the shortcomings, the present invention tends to provide a slat angle adjusting device to mitigate or obviate the aforementioned problems.

SUMMARY OF THE INVENTION

The main objective of the invention is to provide a slat angle adjusting device for a venetian blind and one that is smooth in operation. The slat angle adjusting device has a body, a pinion, a drive axle, a rotating rod and a roller. The body is composed of a base and a cover. A positioning bar is formed on the top of the base. The pinion is rotatably mounted inside the body and a non-circular hole is defined through the pinion. The drive axle is rotatably mounted inside the body, engages with the pinion and has at least one helical tooth and an engaging end provided with multiple teeth. The at least one helical tooth is formed on the outer periphery of the drive axle and engages with the pinion. Each helical tooth is composed of multiple separate helical tooth elements, and a gap is defined between each pair of adjacent helical tooth elements. The rotating rod is rotatably attached to the body and has an inner end and an outer end. The inner end extends into the body and is provided with multiple teeth engaging with the teeth on the engaging end of the drive axle. The roller is attached to the outer end of the rotating rod. With the arrangement of gaps between the teeth elements, burs are prevented from occurring on the helical teeth of the drive axle, such that the transmission between the drive axle and the pinion is smooth.

Other objects, advantages and novel features of the invention will become more apparent from the following detailed description when taken in conjunction with the accompanying drawings.

DETAILED DESCRIPTION OF PREFERRED EMBODIMENT

Figure 1:
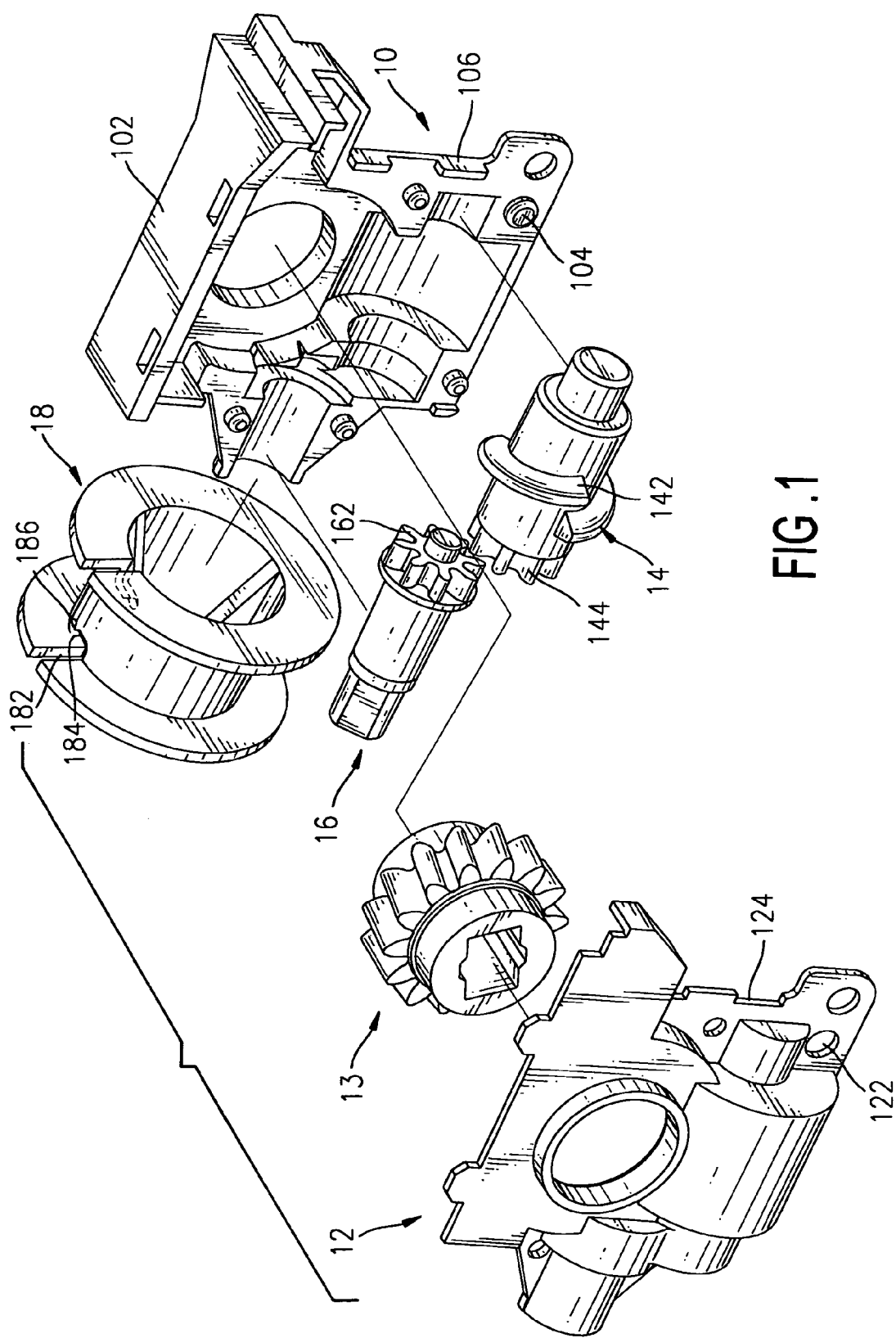
FIG. 1 is an exploded perspective view of a first embodiment of a slat angle adjusting device in accordance with the present invention.
Figure 2:
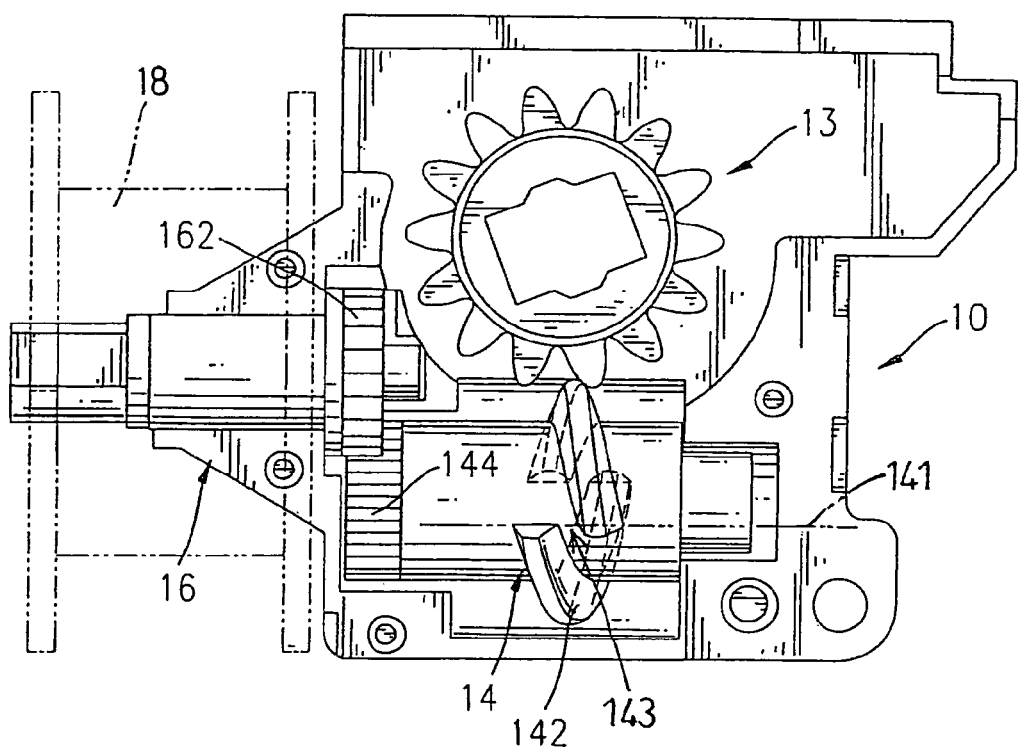
FIG. 2 is a side plan view in partial cross section of the slat angle adjusting device in FIG. 1.
Figure 3:
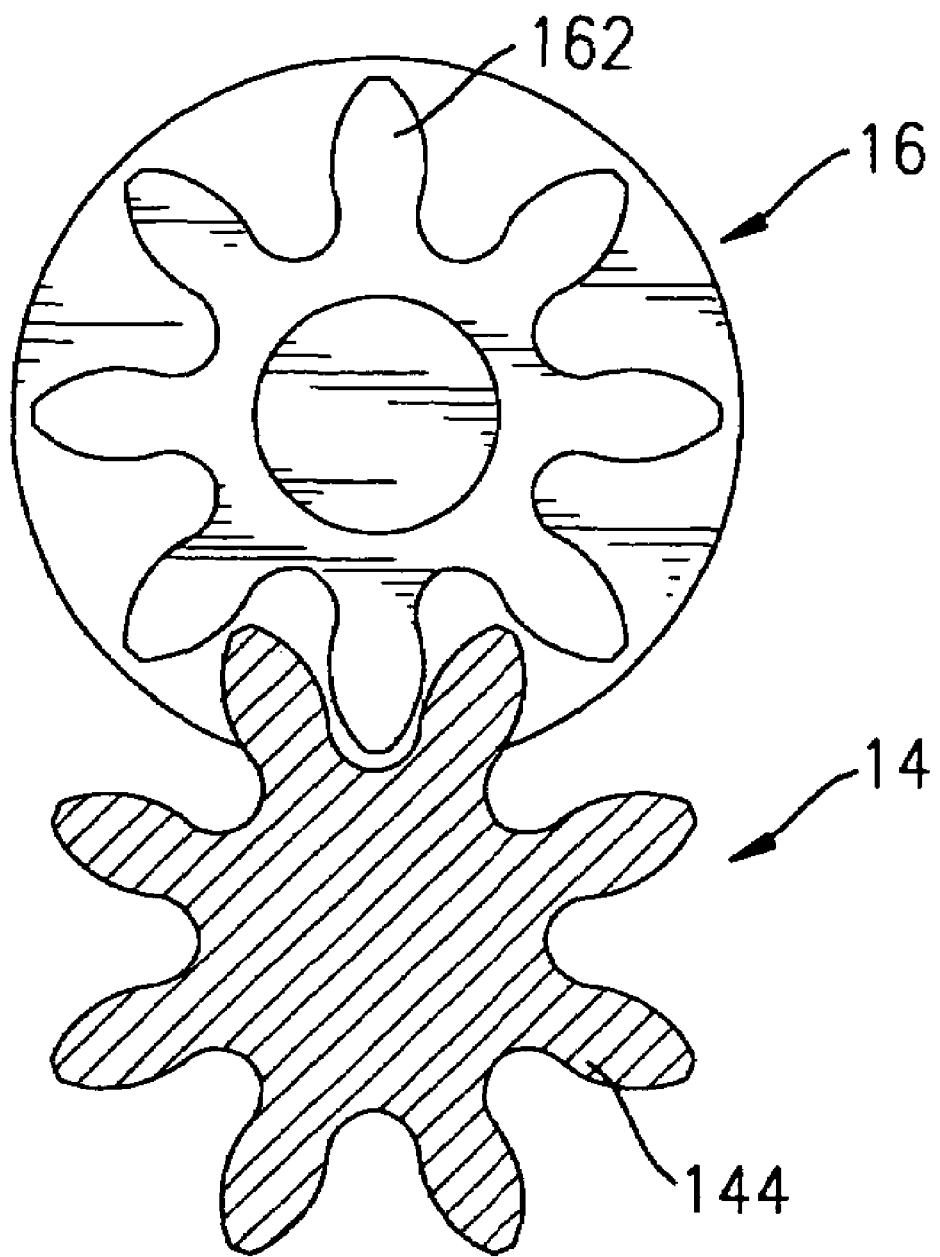
FIG. 3 is a side plan view in partial cross section of the slat angle adjusting in FIG. 1 showing shapes of the teeth on the engaging ends of the drive axle and the rotating rod.

With reference to FIGS. 1 and 2, a slat angle adjusting device for a venetian blind in accordance with the present invention comprises a body, a pinion (13), a drive axle (14), a rotating rod (16) and a roller (18). The body is composed of a base (10) and a cover (12). The cover (12) is securely attached to the base (10) with fasteners, such as bolts or rivets. The base (10) has multiple stubs (104) and tabs (106) formed on the base (10) at one side facing the cover (12). The cover (12) has multiple bores (122) to respectively hold the stubs (106) on the base (10) and notches (124) to respectively hold the tabs (106) on the base (10). With the arrangements of the stubs (104), tabs (106), bores (122) and the notches (124), a positioning effect is provided and the base (10) and the cover (12) can be precisely combined with each other.

The base (10) has a positioning bar (102) formed on the top of the base (10) to engage with a headrail of the venetian blind. In a preferred embodiment, the positioning bar (102) has a protuberance end, such that the engagement between the positioning bar (102) and the headrail is improved.

The pinion (13) is rotatably mounted inside the body and a non-circular hole is defined through the pinion (13). With the through hole, the pinion (13) engages with a tilt rod with a non-circular cross section to drive the tilt rod to rotate with the pinion (13).

Figure 4:
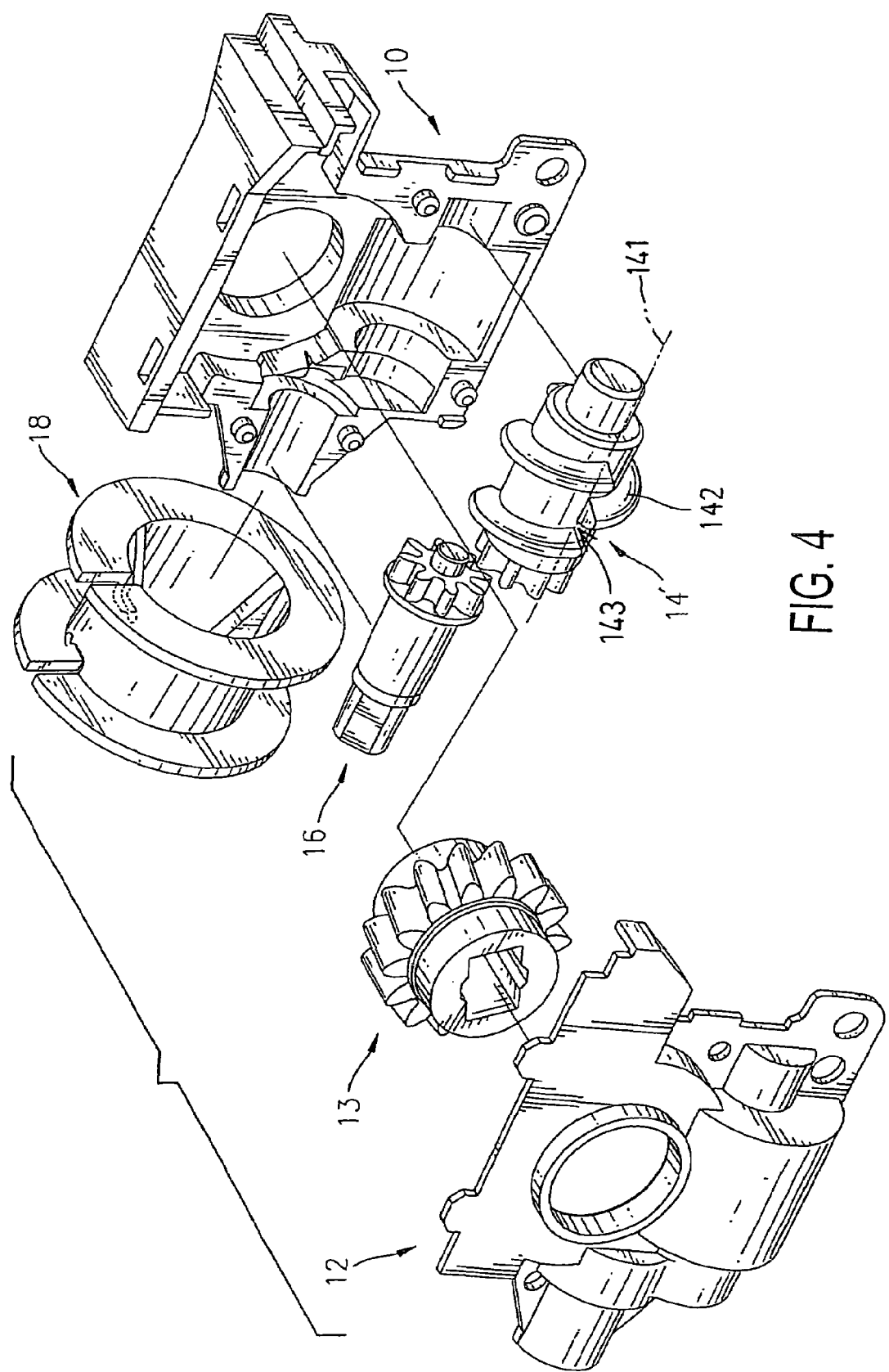
FIG. 4 is an exploded perspective view of a second embodiment of a slat angle adjusting device in accordance with the present invention.
Figure 5:
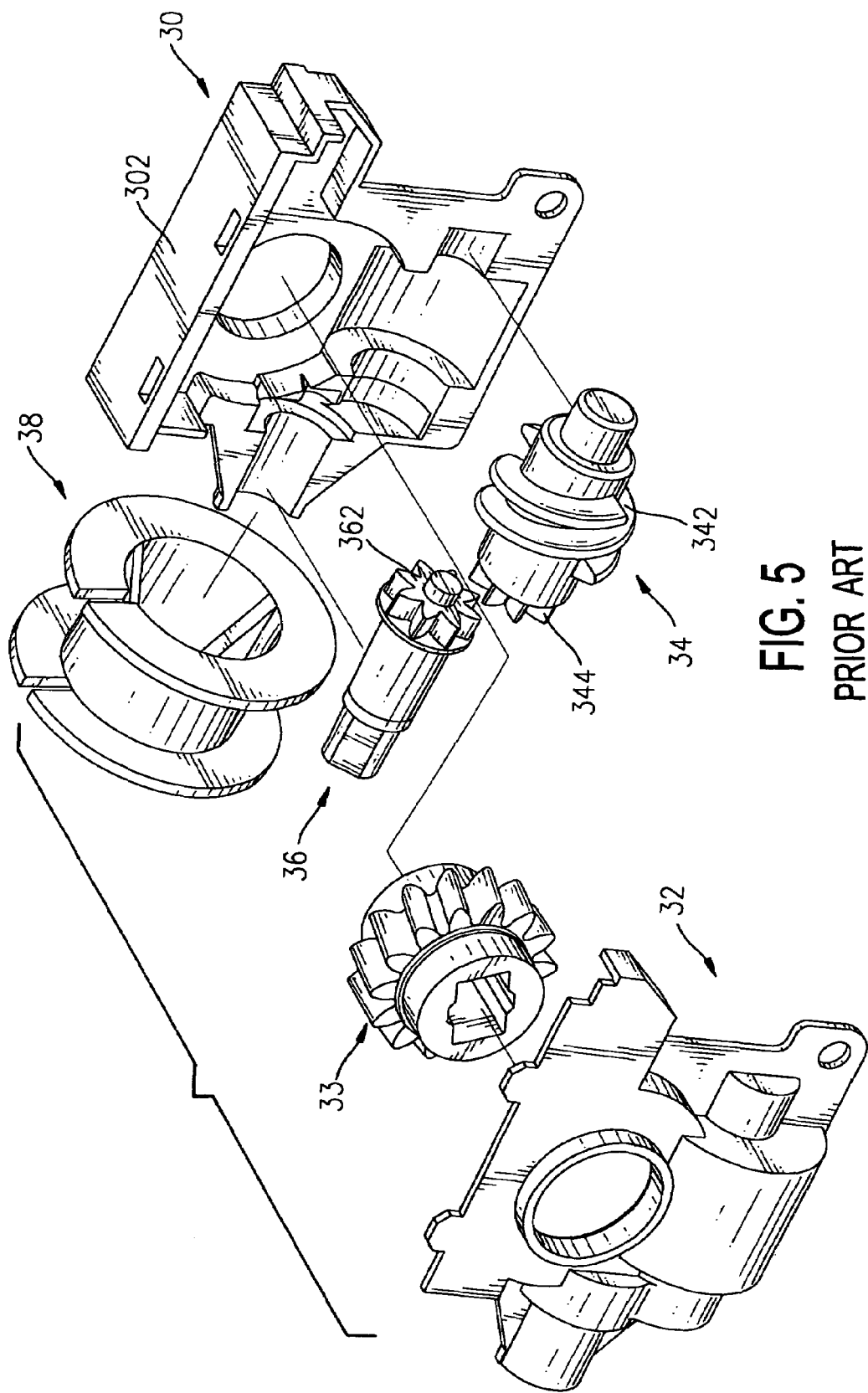
FIG. 5 is an exploded perspective view of a conventional slat angle adjusting device in accordance with the prior art.
Figure 6:
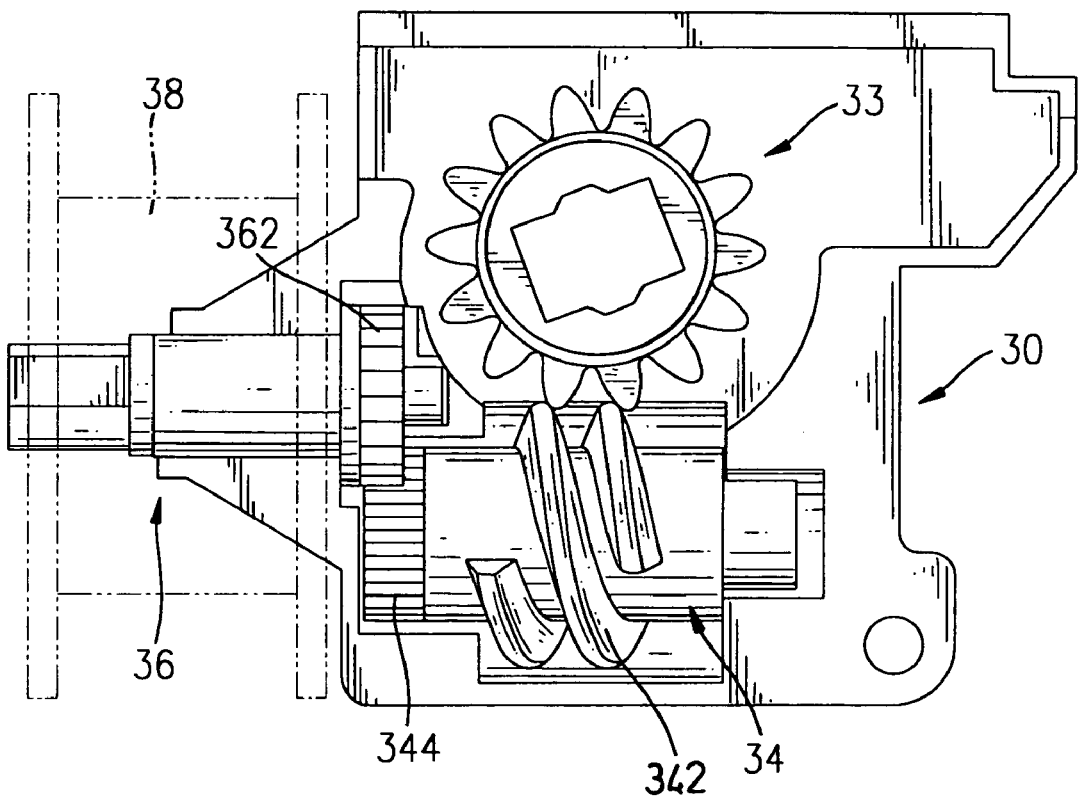
FIG. 6 is a side plan view in partial cross section of the conventional slat angle adjusting device in FIG. 5.
Figure 7:
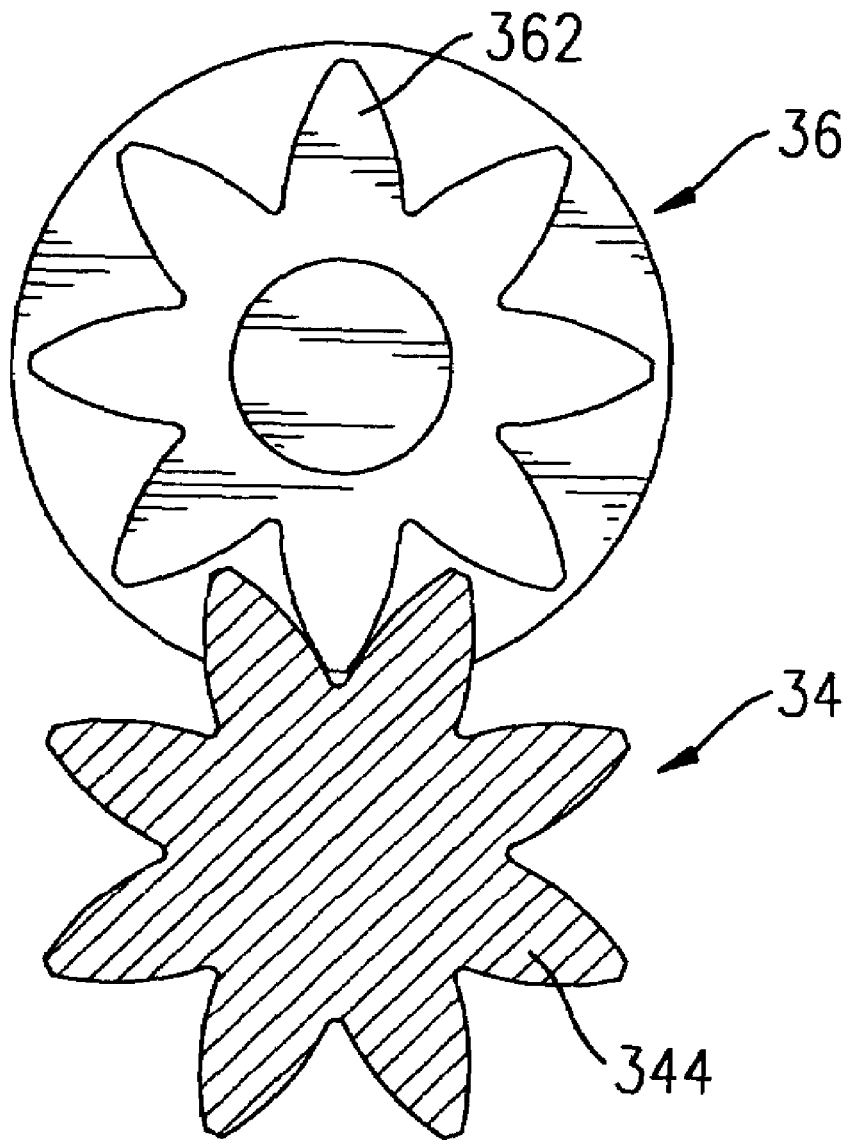
FIG. 7 is a side plan view in partial cross section of the conventional slat angle adjusting in FIG. 5 showing shapes of the teeth on the engaging ends of the drive axle and the rotating rod.

The drive axle (14) is rotatably mounted inside the body and engages with the pinion (13). The drive axle (14) has an outer periphery, at least one helical tooth (142) and an engaging end provided with multiple teeth (144). In a preferred embodiment, the drive axle (14,14') has two helical teeth (142) as shown in FIG. 1 or four helical teeth (142) as shown in FIG. 4. The helical teeth (142) are formed on the outer periphery of the drive axle (14,14') and engage with the pinion (13). Each helical tooth (142) is composed of multiple separate helical tooth elements, and a gap (143) is defined between each pair of adjacent helical tooth elements. In addition, each helical tooth element has a length shorter than half circumference of the outer periphery of the drive rod (14,14'), and the gaps (143) between helical tooth elements are arranged in two longitudinal lines (141) along the outer periphery of the drive rod (14,14').

The rotating rod (16) is rotatably attached to the body and has an inner end and an outer end. The inner end extends into the body and is provided with multiple teeth (162) engaging with the teeth (144) on the engaging end of the drive axle (14). The outer end extends out of the body. In a preferred embodiment, each tooth (144,162) on the drive axle (14) and the rotating rod (16) has an elongated cross section to enlarge the clearance between the teeth (144,162).

The roller (18) is attached to the outer end of the rotating rod (16) for a tilt cord being mounted around the roller (18). Accordingly, when the tilt cord is pulled, the roller (18) rotates. The roller (18) has two flanges respectively formed on two ends of the roller (18) to hold the tilt cord between the flanges. Each flange has a notch (182) for one end of the tilt cord to pass through the flange from the notch (182). Two recesses (184) are defined in the roller (18) and communicate respectively with the notches (182) for respectively holding knobs formed on ends of the tilt rod to keep the tilt cord from escaping the roller (18). Each notch further has a tip (186) formed on the inner surface of the notch (186). With the arrangement of the tips (186), the engagement between the recess (184) and the tilt cord is particularly effective.

With the arrangement of the truncated helical teeth (142) on the drive axle (14,14'), the conjunction of mold elements of a mold for manufacturing the drive axle (14,142') can be designed to correspond to the gaps (143) between the tooth elements. Accordingly, burs are prevented from occurring on the helical teeth (142), such that the transmission between the drive axle (14,14') and the pinion (13) is smooth.

In addition, with the elongated cross section of the teeth (144,162) on the drive axle (14) and the rotating rod (16), the clearances between the teeth (144,162) are well defined. Accordingly, the engagement between the teeth (144,162) on the drive axle (14) and the rotating rod (16) is always at a good condition even when inaccuracies in sizes or shapes occur in the teeth (144,162).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slat angle adjusting device comprising:
   a body composed of
      a base having a top and a positioning bar formed on the top; and
      a cover attached to the base;
   a pinion rotatably mounted inside the body and having a non-circular hole defined through the pinion;
   a drive axle rotatably mounted inside the body, engaging with the pinion and having an outer periphery and an engaging end provided with multiple teeth;
   a rotating rod rotatably attached to the body and having
      an inner end extending into the body and provided with multiple teeth engaging with the teeth on the engaging end of the drive axle, and
      an outer end extending out of the body; and
   a roller attached to the outer end of the rotating rod,
   wherein the drive axle has at least one helical tooth formed on the outer periphery and engaging with the pinion;
   each one of the at least one helical tooth is composed of multiple separate helical tooth elements, and each helical tooth element has a length shorter than half a circumference of the outer periphery of the drive rod; and
   a gap is defined between adjacent helical tooth elements and is arranged in a longitudinal line along the outer periphery of the drive rod.

2. The adjusting device as claimed in claim 1, wherein each tooth on the engaging end of the drive axle has an elongated cross section; and each tooth on the inner end of the rotating rod has an elongated cross section.

3. The adjusting device as claimed in claim 2, wherein the base further has multiple stubs and tabs; and the cover further has multiple bores to respectively hold the stubs on the base inside the bores and notches to respectively hold the tabs on the base inside the notch.

4. The adjusting device as claimed in claim 3, wherein the roller has two flanges respectively formed on two ends of the roller and each flange has a notch; the roller further has two recesses communicating respectively with the notches in the flanges and each notch having an inner surface; and each notch has a tip formed on the inner surface of the notch.

5. The adjusting device as claimed in claim 4, wherein the drive rod has two helical teeth.

6. The adjusting device as claimed in claim 4, wherein the drive rod has four helical teeth.

7. The adjusting device as claimed in claim 4, wherein the positioning bar has a protuberance end.

8. The adjusting device as claimed in claim 1, wherein the base further has multiple stubs and tabs; and the cover further has multiple bores to respectively hold the stubs on the base inside the bores and notches to respectively hold the tabs on the base inside the notches.

9. The adjusting device as claimed in claim 1, wherein the roller has two flanges respectively formed on two ends of the roller and each flange has a notch; the roller further has two recesses communicating respectively with the notches in the flanges and each notch having an inner surface; and each notch has a tip formed on the inner surface of the notch.

10. The adjusting device as claimed in claim 1, wherein the drive rod has two helical teeth.

11. The adjusting device as claimed in claim 10, wherein each helical tooth element has a length shorter than half circumference of the outer periphery of the drive rod; and the gaps between the helical tooth elements are arranged in two longitudinal lines along the outer periphery of the drive rod.

12. The adjusting device as claimed in claim 1, wherein the drive rod has four helical teeth.

13. The adjusting device as claimed in claim 1, wherein the positioning bar has a protuberance end.

\* \* \* \* \*